United States Patent [19]

Chizallet et al.

[11] Patent Number: 4,672,544

[45] Date of Patent: Jun. 9, 1987

[54] DOSIMETER-RADIATION METER AND METHOD FOR MEASURING THE DOSE FLOW OF IONIZING RADIANCE

[75] Inventors: Pierre J. Chizallet; Jean C. Drevet, both of St. Etienne; Henri J. Monnatte, Le Chambon-Feugerolles; Henri P. Meillant, St. Etienne; Yves J. Taillandier, St. Etienne/St. Victor, all of France

[73] Assignee: Etat Francais, Paris, France

[21] Appl. No.: 522,800

[22] Filed: Aug. 12, 1983

[30] Foreign Application Priority Data

Aug. 12, 1982 [FR] France ................. 82 14033

[51] Int. Cl.[4] ................ G01T 1/18; G01T 1/22; G01T 1/24; H01J 47/02
[52] U.S. Cl. .................. 364/414; 364/413; 364/527; 364/573; 250/370; 250/374; 250/371; 250/336.1
[58] Field of Search ............. 364/413, 414, 527, 573; 250/370 F, 374, 375, 371, 388, 336.1, 370 K, 370 L

[56] References Cited

U.S. PATENT DOCUMENTS

| | | | |
|---|---|---|---|
| 3,878,373 | 4/1975 | Blum .................... | 364/414 |
| 4,060,726 | 11/1977 | Lurtwieler et al. ......... | 250/252.1 |
| 4,090,082 | 5/1978 | Marshall et al. ........... | 250/375 |
| 4,292,539 | 9/1981 | Todd .................... | 250/388 X |
| 4,311,909 | 2/1982 | Utting et al. ............. | 250/374 |
| 4,369,495 | 1/1983 | Inbar et al. .............. | 250/388 X |
| 4,408,164 | 10/1983 | East et al. ............... | 364/527 |
| 4,419,599 | 12/1983 | East .................... | 250/374 |
| 4,423,329 | 12/1983 | De Burgos Garica ........ | 250/374 |
| 4,426,579 | 1/1984 | Cooley et al. ............. | 250/374 |
| 4,460,830 | 7/1984 | Allemaid et al. ........... | 250/370 F |
| 4,480,311 | 10/1984 | Mastain et al. ............ | 364/527 |
| 4,491,733 | 1/1985 | Wasserman ............... | 250/370 |

FOREIGN PATENT DOCUMENTS 2080944A 2/1982 United Kingdom ........... 250/374

OTHER PUBLICATIONS

European Patent 0101353, Jul. 20, 1983, (Search Report only).

Primary Examiner—Jerry Smith
Assistant Examiner—Charles B. Meyer
Attorney, Agent, or Firm—Parkhurst & Oliff

[57] ABSTRACT

Disclosed is a dosimeter-radiation meter for measuring a dose flow of ionizing radiation including a Geiger-Mueller tube and data processing circuitry. The data processing circuitry comprises a circuit for shaping and amplifying the pulses delivered by the tube, circuits for storing digital representations of characteristic parameters associated with a particular Geiger-Mueller tube, a section circuit for applying either sensed pulses or the coded parameters to a calculation unit, a calculation unit for counting pulses and for correcting the pulse count according to the precoded stored parameters and a display unit for displaying the dose count or flow rate.

13 Claims, 13 Drawing Figures

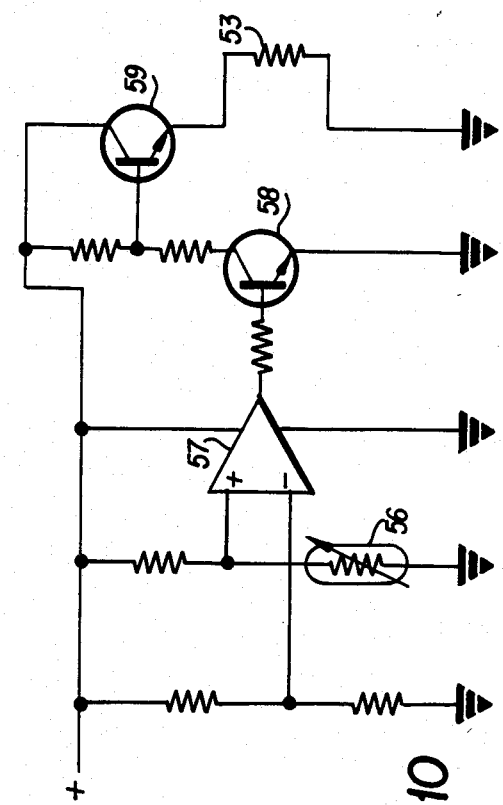
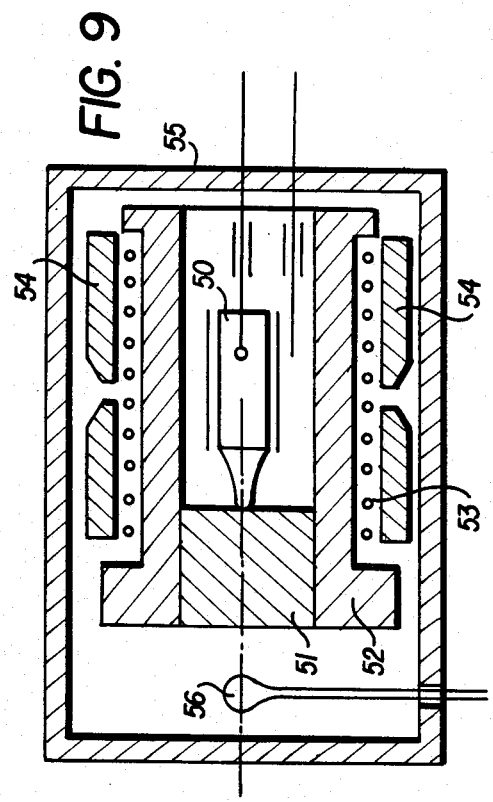
FIG. 7
FIG. 9
FIG. 10

DOSIMETER-RADIATION METER AND METHOD FOR MEASURING THE DOSE FLOW OF IONIZING RADIANCE

TECHNICAL FIELD

This invention relates to a dosimeter-radiation meter for measuring the dose flow or the dose of ionizing radiation. The invention includes a radiation sensor, like a Geiger-Muller tube, which transmits electrical impulses of which the frequency varies in relation to the dose flow, and a processing circuit that is connected with the radiation sensor.

The invention also relates to a method for linearizing the electric response of a radiation sensor such as a Geiger-Muller tube in relation to the dose flow of the ionizing radiation which crosses the tube.

BACKGROUND OF THE INVENTION

It is known that the electric response from a Geiger-Muller tube is not directly proportional to the dose flow I. This does not represent a problem when the display of the result of the measurements is achieved with an analog system such as a needle voltmeter, but it turns out to be a problem when the display is digital.

This invention is designed to achieve a dosimeter-radiation meter which makes it possible to measure a dose flow or a dose of ionizing radiation with a digital display, the device being such that it displays a linear response from the signal that is transmitted by the sensor which is comprised of a Geiger tube and knowledge of the parameters that are proper to the Geiger tube. Those goals are met with a dosimeter-radiation meter which includes, according to the invention, a circuit for matching and shaping impulses that are transmitted by the Geiger tube, pure binary number digital coding circuits for digitally coding the particular parameters K and $\tau$ of the Geiger tube (K representing efficiency and $\tau$ dead time), parallel input and series output registers having inputs are connected respectively to the digital coding circuits, a selecting circuit for connecting the matching circuit and the register outputs and also ensuring connection between a microprocessor system and a dose flow display unit.

The selecting circuit includes an interrogation connection which comes from the calculating microprocessor, a monostable circuit connected to the interrogation connection and a switch to bring the interrogation connection in communication either with the matching circuit output to receive impulses that are transmitted by the formatted Geiger tube, or with the register output to receive coded data relating to the K and $\tau$ parameters.

Advantageously, the dosimeter includes a probe casing and a processing casing connected together. The probe casing includes the radiation sensor, the matching circuit, the coded K and $\tau$ parameter introduction circuit and the selecting circuit. The processing casing includes the microprocessor unit and the display unit.

According to a specific embodiment, the matching and shaping circuit includes a first low threshold comparator which ensures matching and saturation sensing, and second comparators in parallel. The inverting inputs of the comparators are connected to the output of the first comparator in order to format and ensure magnification of the signal that comes from the first comparator.

According to a specific implementation mode, the impulses that appear on the resisting load of the Geiger tube are applied to the inverting input of the first comparator. An initial high value resistor and the cathode of a diode are connected to the inverting input of the first comparator, while the second end of the resistor and the anode of the diode are connected to the non inverting input of the first comparator. A condensor is connected between the non inverting input of the first comparator and the ground, and poling resistors ensure application to the inverting and non inverting inputs of the comparator of positive poling voltage that is greater than the comparator threshold voltage.

According to another embodiment, the dosimeter includes means to maintain at saturation level the matching and shaping circuit when the Geiger tube operates under very intense exposure.

The invention also generally pertains to a method of linearizing the electric response from a radiation sensor like a Geiger-Muller tube in relation to the dose flow of ionizing radiation which crosses the tube, characterized in that a pure binary number digital code is established for the specific parameters K and $\tau$ of the Geiger tube K representing efficiency and $\tau$ dead time. First parameters K and $\tau$ are digitally stored into a memory. The number Ne of impulses transmitted by the Geiger tube are then counted for a preset measuring period. Finally, an altered number $N_S$ of impulses is calculated from the formula $$N_S = Ne/[K(1-\tau Ne)] \tag{1}$$

where a is a constant, and displaying an exposure dose flow from the calculated number $N_S$ of impulses.

According to this method, we can also conduct a deflection correction in the tracing of a dose flow curve in relation to time. According to the method, an altered $N'_S$ number of impulses is calculated from the formulas $$N'_S = 1.207 N_S - 60 \tag{2}$$

if the number of altered $N_S$ impulses is in an average exposure zone and $$N'_S = 0.707 N_S + 1873 \tag{3}$$

if the number $N_S$ of impulses is in a high exposure zone. An exposure dose flow can be displayed from the calculated number $N'_S$ of impulses.

Furthermore, we realized that the electric response from a Geiger-Muller tube displays equilibrium deficiencies when the temperature changes, especially below 0° C.

Another feature of the dosimeter according to the invention rests in the fact that it includes a thermostat structure inside which the radiation sensor is placed, together with a heating resistor coiled around it made of an alloy that contains a high copper content coiled around it, and a thermistor for temperature sensing. Preferably, the coiled heating resistor is surrounded by two metal half-shells.

Other features and advantages will be realized in the description that follows of a particular embodiment of the invention, with reference to the attached drawings.

BRIEF DESCRIPTION OF THE DRAWINGS

FIG. 7 shows two curves that indicate the accuracy of the dose value displayed according to the value of real output for one unaltered dosimeter-radiation meter, and for a dosimeter-radiation meter that is correction calibrated.

FIG. 9 is a schematic view of a Geiger-Muller tube in a thermostat structure,

FIG. 10 is an electric diagram which enables the adjustment of the assembly that is depicted in FIG. 9.

DESCRIPTION OF THE PREFERRED EMBODIMENT

Figure 1:
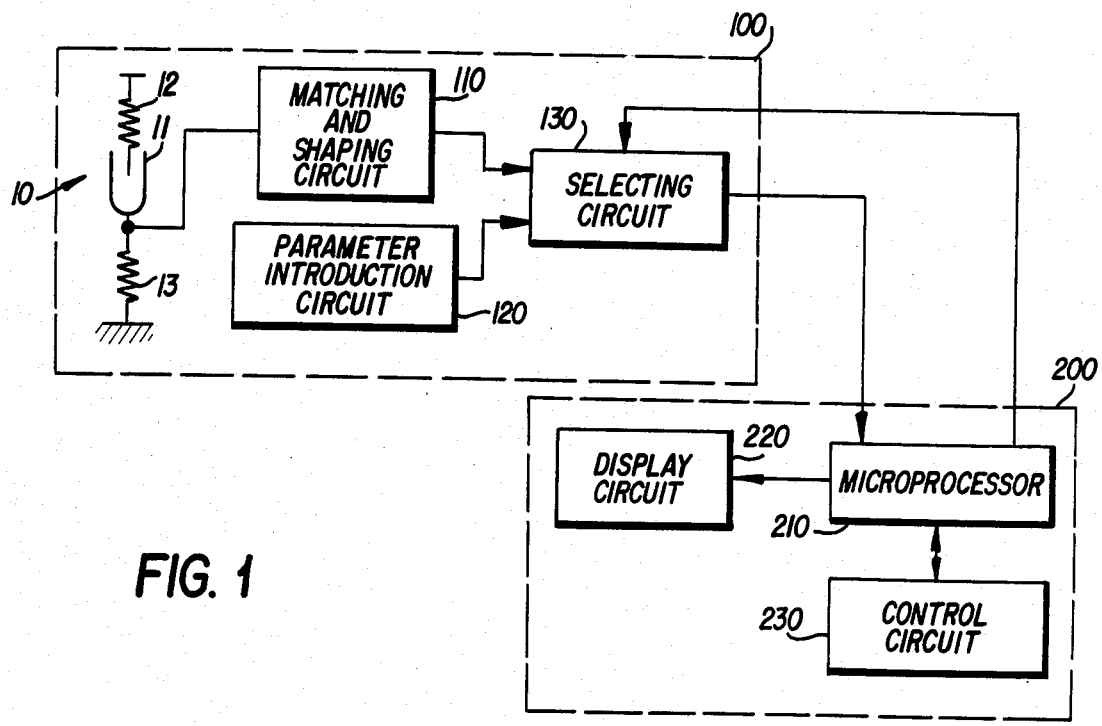
FIG. 1 is a schematic view of the overall dosimeter-radiation meter according to the invention.

The diagram in FIG. 1 makes it possible to understand the overall organization of the dosimeter-radiation meter according to the invention. The Geiger-Muller sensor 10 includes the tube 11 that is connected to a biasing resistor 12 and a load resistor 13. Tube 10 supplies electric impulses the frequency of which is a function of the dose flow of ionizing radiation $\gamma$ that crosses the sensor. The number Ne of impulses at a given time is expressed as a function of the dose flow I according to the following formula:

$$Ne = (KI)/(I + K\tau I) \quad (4)$$

where K and $\tau$ represent respectively efficiency and dead time that are specific parameters for each Geiger tube.

The impulses that are transmitted by the Geiger tube 10 are formatted in the matching and shaping circuit 110. A selecting circuit 130 makes it possible to inhibit impulses from circuit which propagate towards a microprocessor circuit 210. While the impulse traffic from the circuit 110 is inhibited the parameter introduction circuit 120 can transmit the coded values of the parameters that are associated with the sensing tube 10 (dead time $\tau$ and efficiency K) to the microprocessor 210. The propagation data, of parameters from the circuit 120 and impulses from circuit 110. Therefore, communication takes place on the same wire by way of the selecting circuit 130. The microprocessor 210 is connected with a display circuit 220 and with control circuits 230 within a control unit 220. This control unit 200, can be connected with varios probe units 100. The K and $\tau$ parameters that are associated with the pick-up 10 are applied by the circuit 120, which is integrated to the probe casing 100, and thus the processing casing 200 is universal for any probe unit 100.

Figure 2:
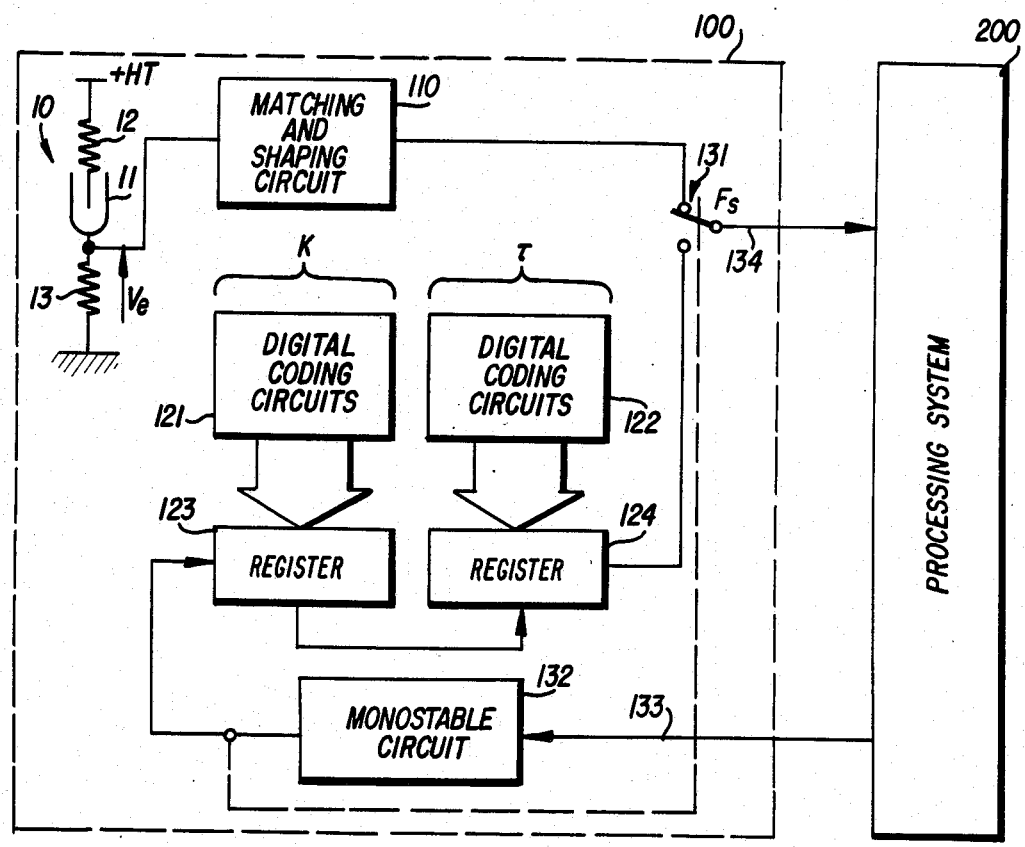
FIG. 2 is a view of part of the dosimeter in FIG. 1 which is contained in a probe casing.

FIG. 2 shows in more detailed fashion the operation of a probe unit 100. Each K and $\tau$ parameter is stored in coded fashion by pure binary number digital coding circuits 121 and 122. As voltage is applied, the microprocessor 210 stores the coding circuit codes 121 and 122 in registers 123 and 124 with parallel input and series output. With an impulse on the clock wire 133. Switch 131, controlled by microprocessor 210, blocks the impulses that are supplied by the Geiger counter 10 and formatted in the circuit 110, and allows the output of parameters stored in registers 123, and 124. After each clock impulse, the microprocessor 210 proceeds with the reading and memorizing of the logical state that appears on the output wire $F_S$ 134. In order to secure information input, the microprocessor 210 can cycle several times the reading of the same codes. After a preset period which is established by the monostable circuit 132, there is a disabling of registers 123 and 124 by flipping the switch 131 and the initiating of a measuring period by transmitting to the microprocessor 210 impulses from the counter 10 conditioned by the circuit 110.

The microprocessor 210 then calculates, from parameters K and $\tau$ and from the number Ne of impulses transmitted by the circuit 110 in a given time, a number $N_S$ which represents a linear function of the I dose flow in a given time, according to the following formula:

$$N_S = (aNe)/[K(1-\tau Ne)] \quad (1)$$

where a represents a proportionality coefficient.

The microprocessor 210 therefore ensures the computing of the dose flow or of the dose that is at the counter 10, and a display is produced by the circuit 200.

The intensity impulses of a loaded Geiger-Muller tube that is fed by constant high voltage have a rapid rise time, of about several nanoseconds, while the fall time is slower, and is in conformity with the dead time $\tau$ of the Geiger tube which is by the.

The difficulty in measuring the impulses which are supplied by the Geiger tube lies in the fact that their magnitude and their base line vary constantly, according to initiating time. The phenomenon increases as the exposure dose flow increases (see the curves of FIG. 3 for which period A corresponds to a small dose, period B corresponds to a strong dose and period C corresponds to a very strong dose).

Figure 4:
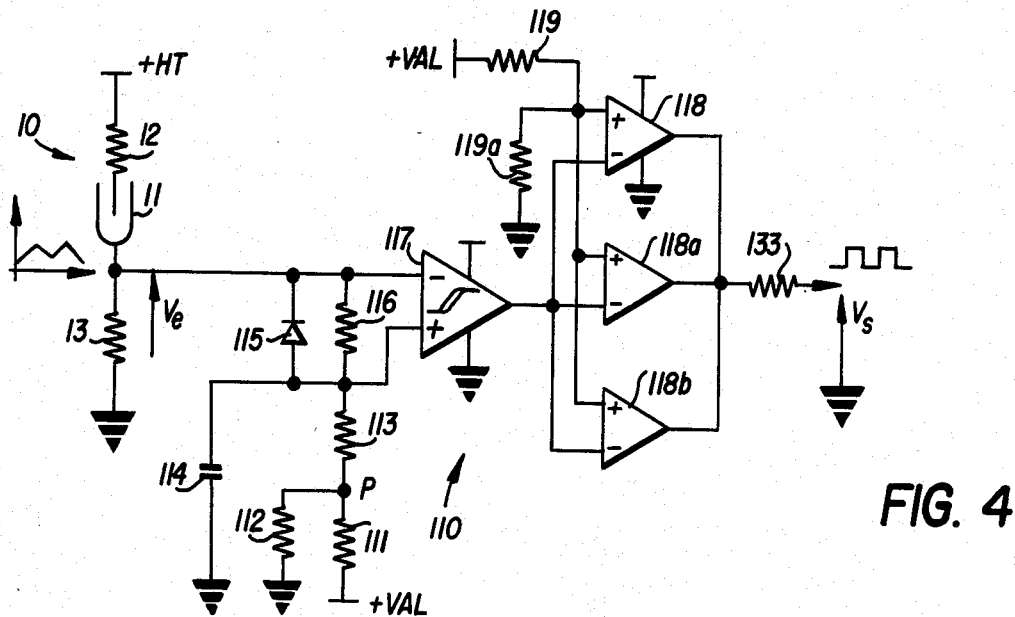
FIG. 4 is a schematic view of a sample matching and shaping electronic circuit for impulses that are transmitted by the Geiger counter.

FIG. 4 shows a sample matching and shaping circuit 110 which makes it possible to process all the impulses that appear on load 13 and to ensure, for excessively intense radiation, the output of a logical state "1" which, when processed, indicates device saturation.

The impulses (Ve signal) which are transmitted by the Geiger tube 10 are applied to the inverting negative input of a comparator 117 with a low threshold that ensures sensing of saturation. Then, the output signal of the comparator 117 is applied in the inverting negative inputs of three other parallel connected comparators 118, 118a and 118b, with low threshold which guarantee shaping and voltage output of the output signal of the comparator 117. The output of comparators 118, 118a and 118b is connected by way of a resistor 133 to the input of the selecting circuit 130 (see FIG. 1). The non inverting positive inputs of the comparators 118, 118a and 118b are maintained at a potential that is defined by biasing resistors 119 and 119a.

The non inverting positive input of the comparator 117 is connected to the positive supply voltage by way of resistors 113 and 111.

The common point P between resistors 111 and 113 is itself connected to ground by a resistor 112. The non inverting positive input of the comparator 117 is furthermore connected to ground by a condensor 114. A diode 115 and a resistor 116 which are in parallel are connected between the inverting negative inputs and the non inverting positive inputs of the comparator 117. The valve of resistor 113 is much higher than that of the resistor 116 and it only acts to bias the comparator 117.

Constant voltage $V_P$ at point P leads to current crossing which makes it possible to apply to the inverting negative and non inverting positive inputs a positive bias voltage, which is higher than the threshold voltage of the comparator, so as to ensure the logical state "0" at output $V_S$ of circuit 110, at rest.

As of the production of a positive impulse on the resisting load 13 that is connected to the Geiger tube 10, the inverting negative input of the comparator 117 is brought to a more positive potential than its non inverting positive input. The output $V_S$ of circuit 110 moves to state "1".

During the production of impulses on the reversing input of the comparator 117, the diode 115 maintains comparator 117 biasing and it enables quick loading of the memory capacity 114. Memory voltage $V_M$ (curve 22 of FIG. 6b) as obtained at the condensor terminals 114 follows the voltage of the rise of impulse Ve (curve 23 of FIG. 6b) within diode voltage $V_D$.

When the falling edge of the impulse goes under the value of voltage $V_M$, the comparator 117 returns to its initial state and output voltage $V_S$ of circuit 110 (FIG. 6c) goes to zero.

During this descending phase of impulse Ve, the memory capacitor 114 discharges through resistors 116 and 13. Hence, memory voltage $V_M$, closely follows the descending edge of impulse Ve and therefore enables the sensing of the following impulse with optimal sensitivity.

Figure 6A:
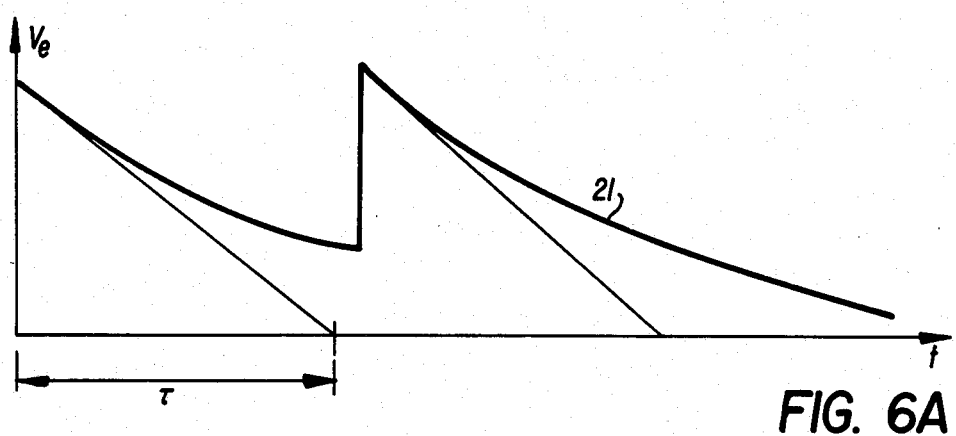
FIGS. 6a through 6c depict the shape of signals that appear respectively (a) at the Geiger tube output on a simple resisting load, (b) at the Geiger tube output on a complex load which includes an matching assembly and (c) at the shaping circuit output of FIG. 4.

FIG. 6a shows the shape of impulses from voltage Ve at the terminals of the load resistor 13 of the Geiger tube 10 in the absence of the matching circuit 110 (curve 21).

Figure 6B:
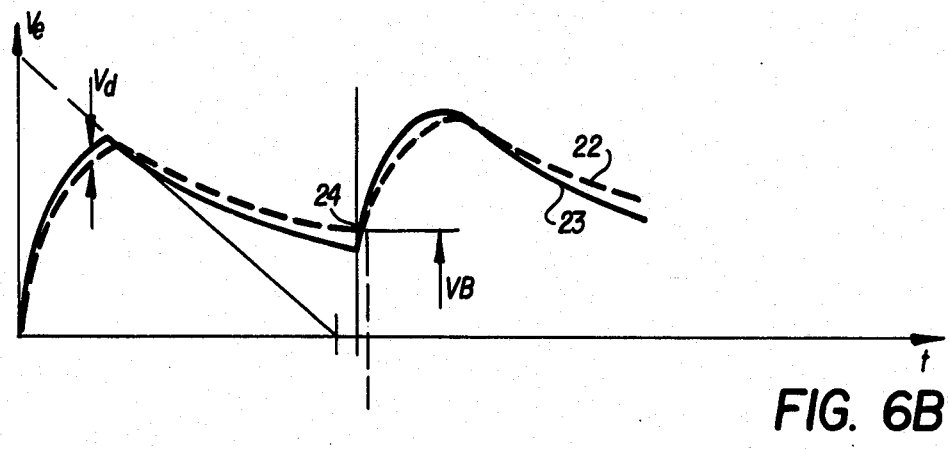

FIG. 6b shows the shape of impulses from voltage Ve when the circuit 110 is connected to the tube 10 (curve 23) and of voltage $V_M$ (curve 22) at the terminals of condensor 114.

Figure 5:
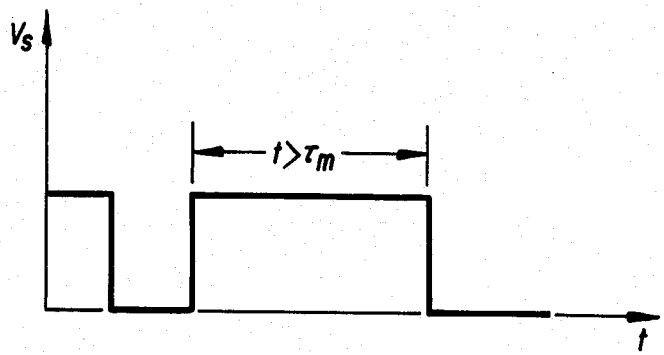
FIG. 5 is a view of the formatted signal that is transmitted at the circuit output in FIG. 4 in the event of saturation.
Figure 6C:
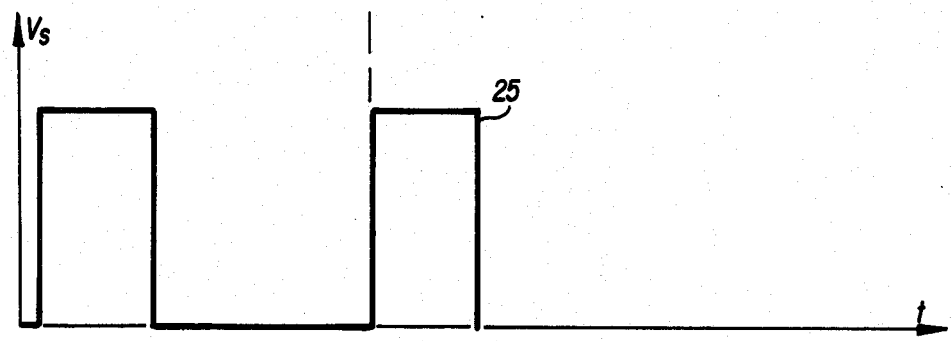

FIG. 6c shows the form of shaped impulses $V_S$ (curve 25) at the output of circuit 110;

FIG. 5 shows the shape of voltage $V_S$ at the output of circuit 110 in the event of a very high exposure dose and shows that the counter is subjected to an intense exposure dose for a long period of time saturated if the tube remains (for a period of time greater than $\tau_M$).

Figure 3:
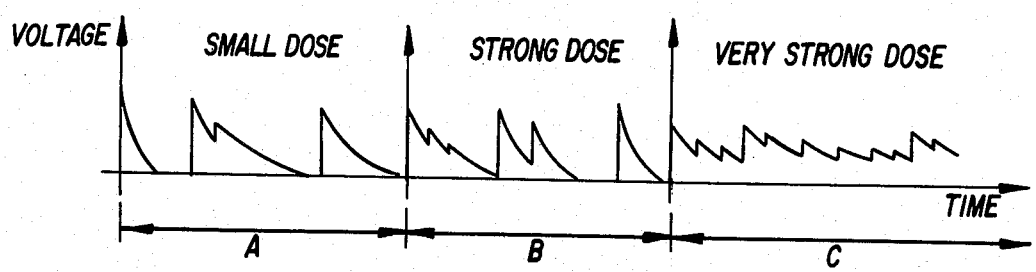
FIG. 3 depicts the shape of output impulses from the Geiger tube that are transmitted on a resistive load, prior to processing and for various radiation doses.

When the Geiger tube 10 operates under very high exposure, there appears a nearly jagged-shaped, voltage Ve which corresponds to the operation of the tube at its threshold voltage (case C of FIG. 3).

The value of resistors 12 and 13 is calculated so that voltage Ve which appears when there are very strong exposures at the terminals of resistor 13 is higher than the constant bias voltage $V_P$. This makes it possible to invert the output $V_S$ and to maintain it at the "1" state which triggers the saturating effect of counting that is represented in FIG. 5.

In some applications where greater accuracy is required, the calculator 210 can take into account the variations of the different parameters. FIG. 7 shows the variations in relation to the real flow on the one hand of flow values displayed in the absence of any additional correcting, by simply applying formula (1) (curve 27), and on the other hand of displayed flow values if specific corrections are conducted designed to compensate for deflections (curve 26).

Thus, in the event of correction, the microprocessor 210 calculates a number of impulses per time unit $N'_S = f(N_S)$ from the number of previously calculated impulses.

As an example, in a first correcting zone (average radiation zone), the following linear correction $N'_S = 1.207 N_S - 60$ can be used, while in a second correcting zone (high radiation zone) the following correction $N'_S = 0.707 N_S + 1873$ can be applied. This guarantees accuracy, in dose flow, that is greater than 10%.

Figure 8A:
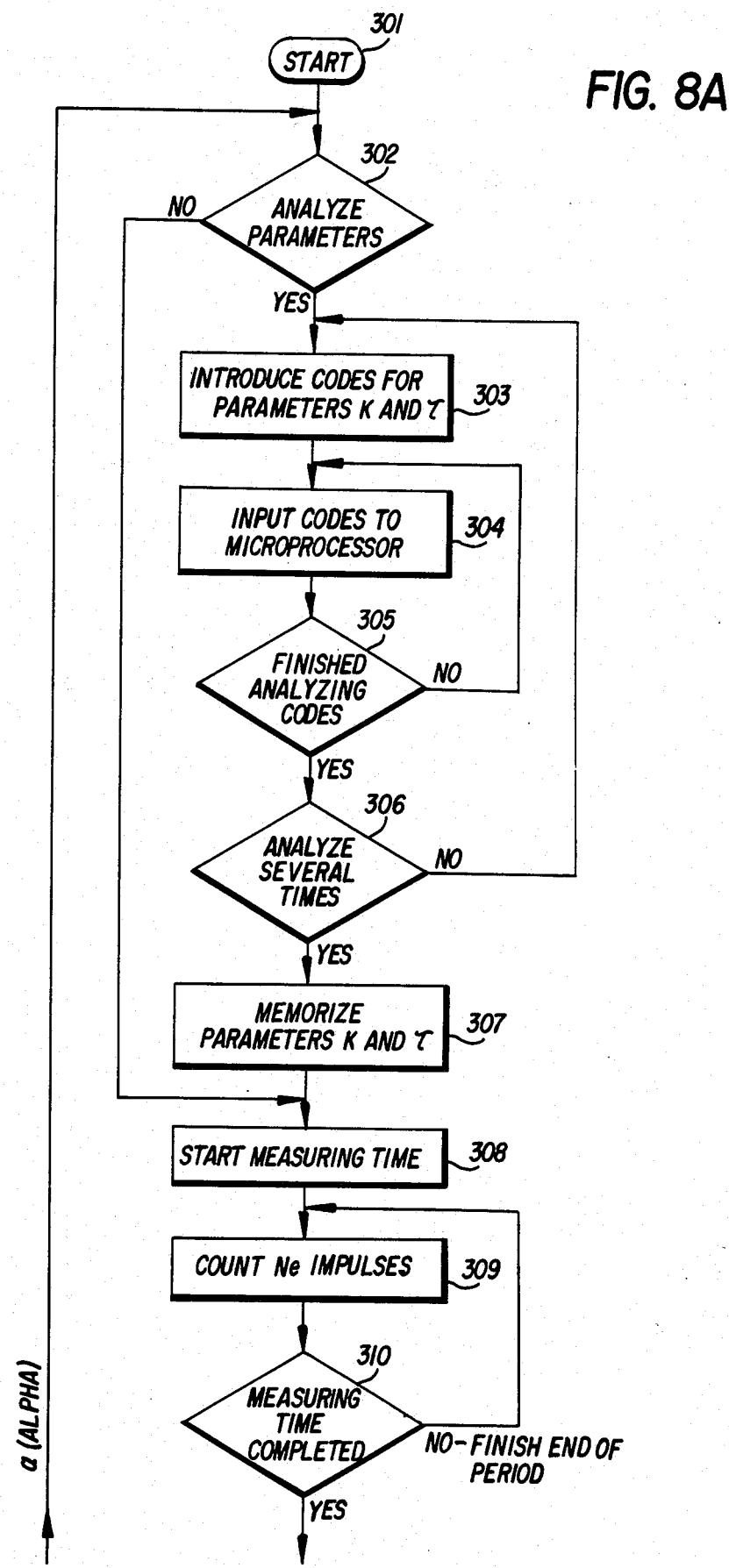
FIGS. 8a and 8b show a flow chart which can be used in programming the microprocessor unit that is included in the dosimeter-radiation meter according to the invention.
Figure 8B:
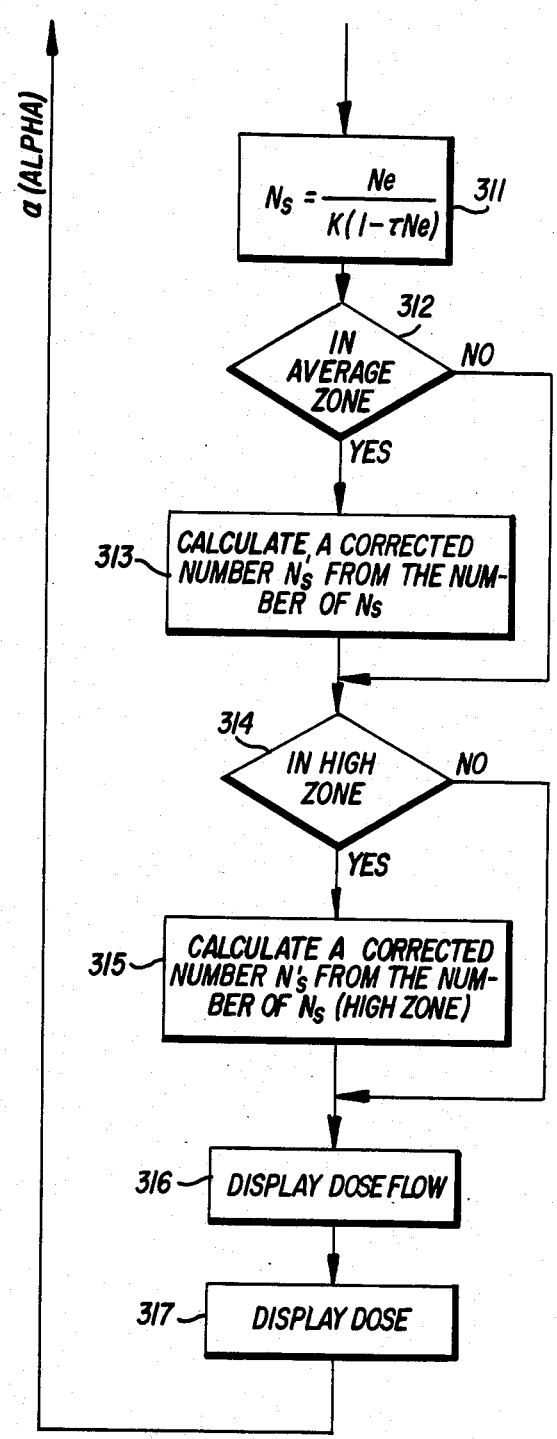

FIGS. 8a and 8b show a flow chart which can be applied to the dosimeter-radiation meter according to the invention so as to enable display of a dose flow or of a dose which is correct, although the number Ne of impulses that is supplied by the Geiger tube 10 is not in and of itself proportional to the dose flow.

After the beginning instruction 301, the question "Do we analyze parameters?" is asked at 302. If the answer is no, there is direct plugging into start-up instruction 308 for measuring time, if the answer is yes, instruction 303 makes it possible to introduce codes for the parameters K and $\tau$ in the parallel-series registers 123, 124, with an impulse on the clock wire 133. The following instruction 304 operates the input of codes that are in the registers in the microprocessor 210. After each impulse on the clock wire 133, there is a reading of the state of the wire 134 (or of the state of the switch 131) and memorizing of that state. The question "finished analyzing the codes?" is asked at 305. If the answer is no instruction 304 is repeated, if the answer is yes the next question is asked at 306: "analyze several times?". If the anser is no control returns to the input of instruction 303; if the answer is yes instruction 307 is implemented, which corresponds to the reordering and memorizing of the parameters K and $\tau$ by breaking down the codes found in the analysis. The next instruction 308 corresponds to the start-up of measuring time. The next instruction 309 counts with the microprocessor the Ne impulses which come from the wire $F_S$. At 310, the next question is asked: "is measuring time over?". If the answer is no the end of the period is awaited and instruction 309 is resumed. If the answer is yes instruction 311 ensures computation with the microprocessor of the number $N_S$ of impulses, according to the formula (1). Block 312 after instruction 311 raises the question "in the average zone?". If the answer is no, conditional block 314 is activated. If the answer is yes instruction 313 applies an initial correcting formula to calculate a corrected number $N'_S$ from the number $N_S$. Then at 314, the next question is asked: "in a high zone?". If the answer is no instruction 316 is implemented. If the answer is yes, instruction 315 applies a second correcting formula which is adapted to the high exposure zones, in order to calculate a corrected number $N'_S$ from $N_S$. Display instruction 316 is then activated to display dose flow, then dose display instruction 317 is implemented, then control is returned to the beginning 301 of the program.

With regard to improving performance during temperature extremes, especially for low temperatures, for instance below 0° C., FIG. 9 shows a variation of the dosimeter according to the invention of which the purpose is to cause heating of the tube in a structure at a specific temperature threshold. This implementation thereby improves the lifespan of the flow-meter.

In FIG. 9, the Geiger-Muller tube 50 is set on its stand 51, inside a spool 52, upon which insulated resistor electric wire 53 is coiled which enables heating. This spooled resistor is surrounded by two metal half-shells 54 for spectral compensation. The thermostat structure is closed by the plastic cylinder 55 and it includes a thermistor 56 which acts a temperature sensor.

FIG. 10 shows the operation of the electronic device which allows for temperature regulation of the radiance sensor.

At temperatures below 0° C. the operation of the Geiger-Muller tube can display some anomalies.

The thermistor 56 which is located inside the structure is mounted as a Wheastone bridge and it makes it possible to trigger the amplifier 57 as of a preset temperature value, which controls by way of two amplifying transistors 58 and 59 current flowing in the heating resistor 53 that is placed around the Geiger-Muller tube.

When the temperature is adequate, the amplifier 57 shuts off the feed to the heating resistor.

This device makes it possible, as an example, to obtain more than 5% accuracy of the dose flow measurement at temperatures of −40° C.

The heating resistor is displayed physically as a wire made from an alloy which contains a high content of copper. This characteristic is used to improve spectral compensation. Indeed, by coiling the wire in the shape of a spool with jointed whorls around the Geiger-Muller tube we use the strong retransmitting power of copper under the influence of low energy radiance, which improves stability in the response of the Geiger-Muller tube to the radiation of various energy levels.

We claim:

1. A method for linearizing the electrical response from a radiation sensor in relation to the dose flow of ionizing radiation detected, comprising:
    digitally coding the efficiency and dead-time parameters of said radiation sensor;
    storing the digitally coded parameters;
    counting the number of impulses transmitted by said radiation sensor for a preset measuring period;
    calculating the number of altered impulses from said efficiency and dead-time parameters and said counted impulses; and
    displaying the dose flow corresponding to said altered number of impulses.

2. A method for linearizing the electrical response from a Geiger-Muller tube in relation to the dose flow of ionizing radiation detected, comprising:
    digitally coding the efficiency K and dead-time $\tau$ parameters of said tube;
    storing the digitally coded parameters;
    counting the number of impulses Ne transmitted by said tube for a preset measuring period;
    calculating the number of altered impulses Ns according to the formula:

$$Ns = (aNe)/[K(1 - \tau Ne)]$$

wherein a represents a proportional constant; and displaying the dose flow corresponding to said altered number of impulses.

3. The method of claim 2, additionally comprising:
    calculating a deflection correction in the tracing of a dose flow curve in relation to time, said correction being calculated by a function linearly dependent upon said altered impulses with a slope greater than one if the altered number of impulses is in an average exposure zone and linearly dependent on said altered impulses with a slope less than one if the altered number of impulses is in a high exposure zone.

4. A dosimeter-radiation meter for measuring a dose flow or a dose of ionizing radiation comprising:
    a radiation sensor for transmitting electric impulses; and
    a processing circuit connected to said radiation sensor comprising:
    a matching and shaping circuit for receiving impulses transmitted by said radiation sensor;
    binary number digital coding circuits for coding the efficiency and dead-time parameterss of said radiation sensor;
    registers for storing said coded parameters having parallel inputs and series outputs with said register inputs connected to said digital coding circuits;
    a selecting circuit for selectively connecting said matching and shaping circuit or said register outputs to a microprocessor unit; and
    a display unit connected to said microprocessor unit to display the dose flow.

5. The dosimeter-radiation meter of claim 4, wherein the frequency of the impulses transmitted by said radiation sensor varies in relation to the dose flow.

6. The dosimeter-radiation meter of claim 4, wherein said radiation sensor is a Geiger-Muller tube.

7. A dosimeter according to claim 6, wherein, the impulses that appear on a resistive load of said Geiger tube are applied to the inverting input of a comparator; the first end of a high value resistor and the cathode of a diode are connected to the inverting input of said comparator; a condensor is connected between the non-inverting input of said comparator and ground; and biasing resistors and connected to ensure the application at inverting and non-inverting inputs of said comparator a positive bias voltage which is greater than the threshold voltage in said comparator.

8. A dosimeter according to claim 6, further comprising means for saturating the matching and shaping circuit when said Geiger tube operates under very high exposure.

9. A dosimeter according to claim 4, wherein said selecting circuit comprises an interrogation connection from the microprocessor unit, a monostable circuit connected to said interrogation connection and a switch to bring the microprocessor unit in communication either with the output of the matching circuit to receive and format impulses which are transmitted by the radiation sensor, or with the output of the registers to receive coded data associated with said parameters of said radiation sensor.

10. A dosimeter according to claim 4, further comprising a probe unit and a processing unit connected to said probe unit, the probe unit comprising said radiation sensor, said matching and shaping circuit, said binary number digital coding circuit, said registers for storing said coded parameters and said selecting circuit, and the processing unit comprising said microprocessor unit and said display unit.

11. A dosimeter according to claim 4, wherein the matching and shaping circuit comprises a first low threshold comparator which ensures matching and sensing of saturation, and a plurality of secondary comparators connected in parallel, the inverting inputs of said secondary comparators being connected to the output of said first comparator to shape and ensure amplification of the signal from said first comparator.

12. A dosimeter according to claim 4, further comprising a thremostat structure in which said radiation sensor is placed, together with a heating resistor for heating said radiation sensor, and a thermistor in proximity to said radiation sensor for temperature sensing.

13. A dosimeter according to claim 12, wherein said heating resistor is made of an alloy that contains a high copper content and is coiled around said radiation sensor, said coiled heating resistor being surrounded by two metal half-shells.

* * * * *